United States Patent
Smith et al.

[15] 3,667,114
[45] June 6, 1972

[54] TOOL CHANGING AND TRANSFER MECHANISM

[72] Inventors: Edwin R. Smith, Seneca Falls; Constantine F. Cafolla, Waterloo, both of N.Y.

[73] Assignee: SFM Corporation, Union, N.J.

[22] Filed: Oct. 2, 1969

[21] Appl. No.: 863,234

[52] U.S. Cl. ............................................29/568, 214/1 BB
[51] Int. Cl. ........................................................B23q 3/155
[58] Field of Search....................29/568, 26; 214/1 BB, 1 BC

[56] References Cited

UNITED STATES PATENTS

| | | | |
|---|---|---|---|
| 3,256,600 | 6/1966 | Swanson | 29/568 |
| 3,458,924 | 8/1969 | Oslebo et al. | 29/568 |
| 3,354,761 | 11/1967 | Sadier | 29/568 X |
| 3,443,310 | 5/1969 | Burroughs et al. | 29/568 |
| 3,466,739 | 9/1969 | Harman | 29/568 |
| 3,259,957 | 7/1966 | Stobbe | 29/26 |

*Primary Examiner*—Andrew R. Juhasz
*Assistant Examiner*—Z. R. Bilinsky
*Attorney*—Christel & Bean

[57] ABSTRACT

A tool changing and transfer mechanism for use with a machine having a tool holding member. A tool storage magazine is arranged in spaced relation to the tool holding member and adapted to store a plurality of tools in a plurality of storage positions. The mechanism includes a tool changer comprising a carrier having plural tool engaging devices for simultaneously carrying a used tool being returned and a new tool to be used. The changer is moved between the storage magazine and machine tool holder by controlled drive means, and the carrier is moved through a path adjacent the magazine storage positions by drive means controlled by sensing means movable with the carrier and engageable with locating stops associated with the storage positions and selectively actuated by a control circuit including a stepping relay and selector switches. The carrier is extended and retracted along a first axis for insertion and removal of a tool, rotated about a second axis intersecting the first axis for alternative positioning of the tool engaging devices, and rotated about a third to orient it one way for removing and replacing tools relative to the magazine and another way for removing and inserting tools relative to the machine tool holding member.

10 Claims, 19 Drawing Figures

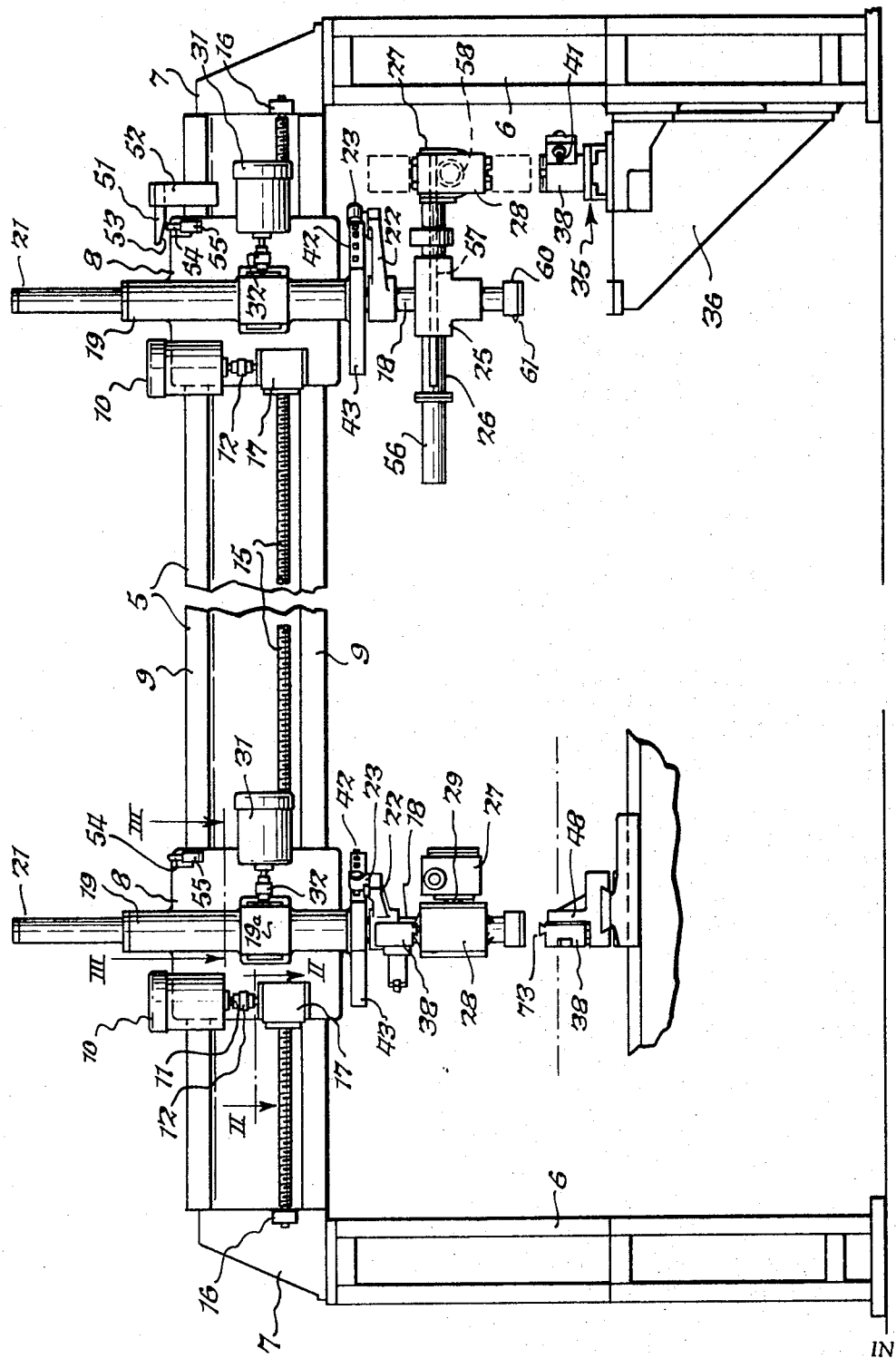

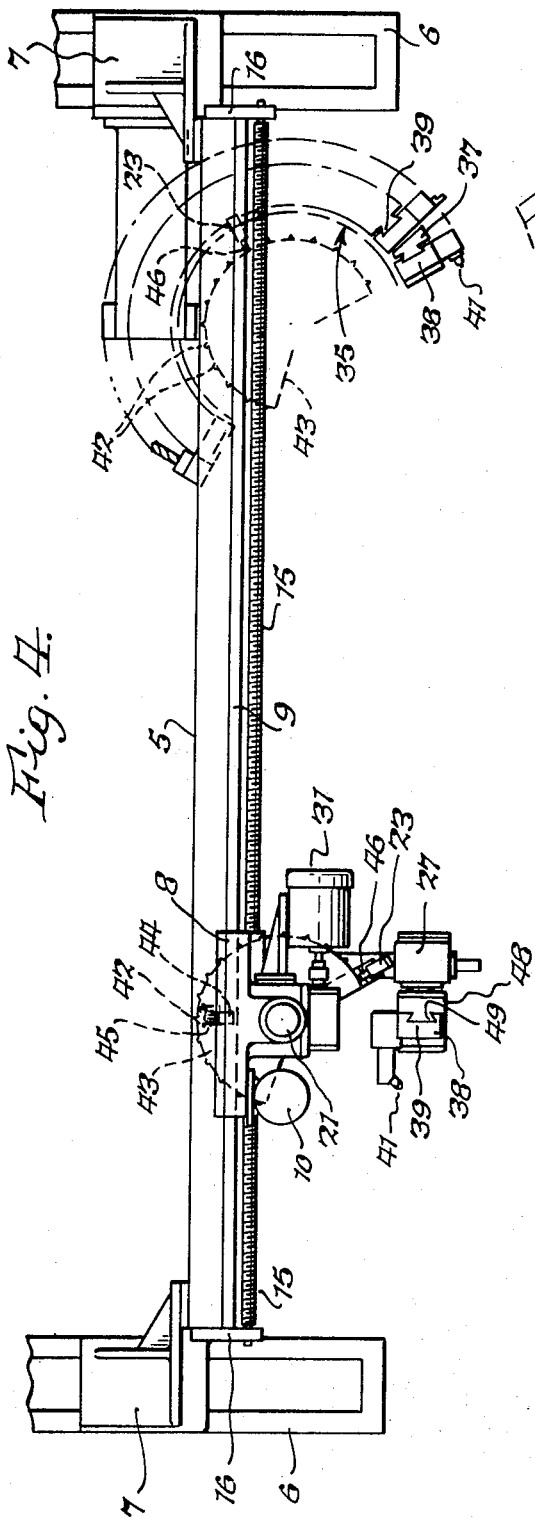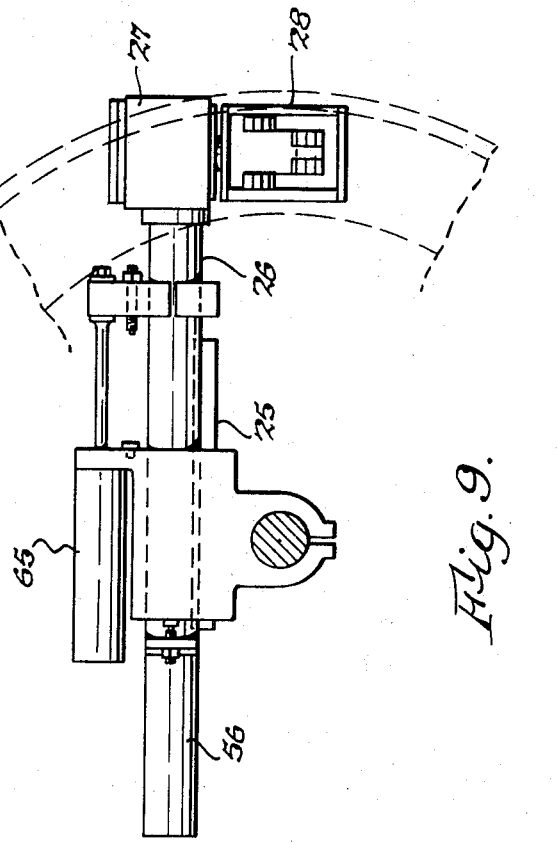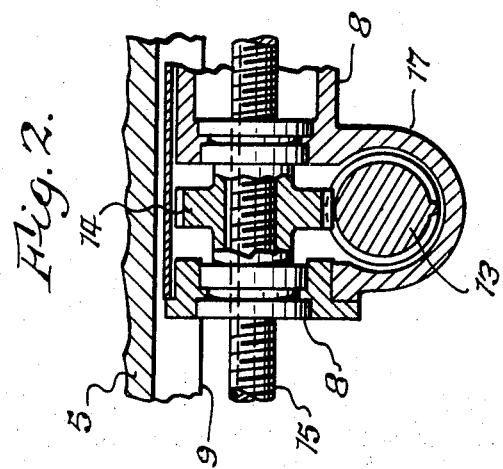

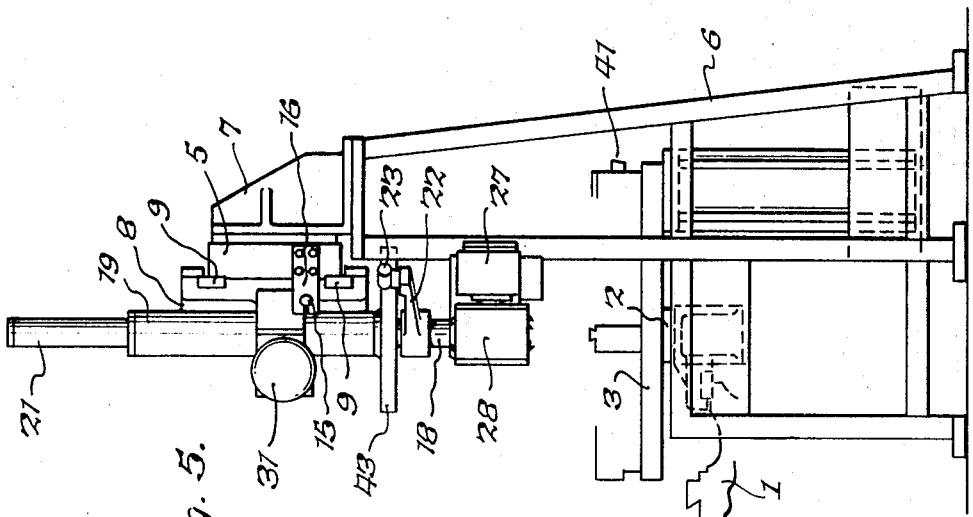
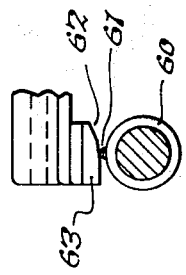
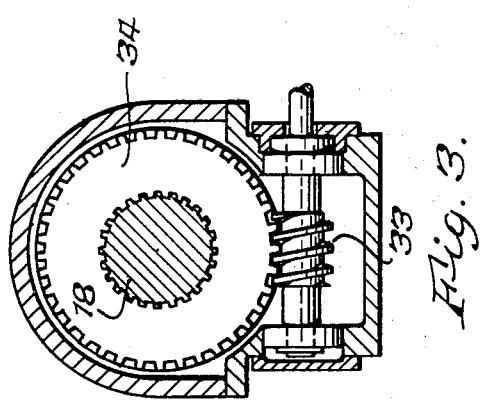
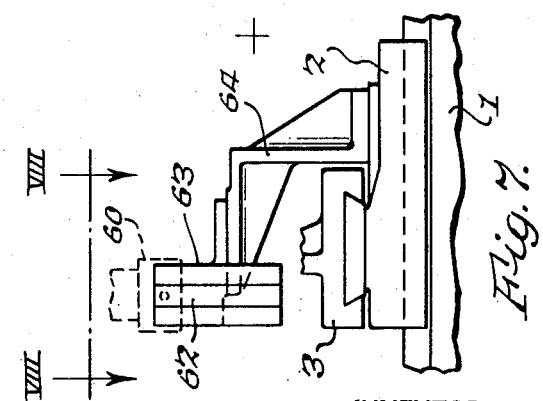

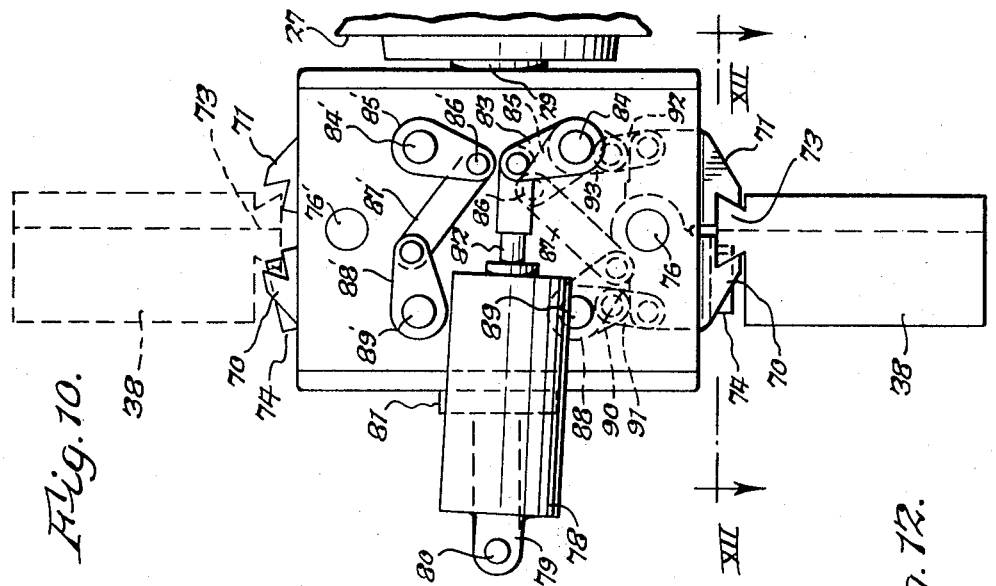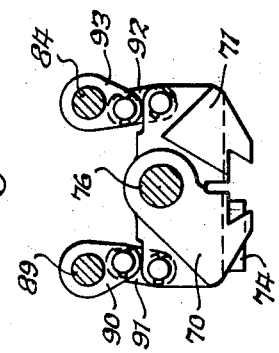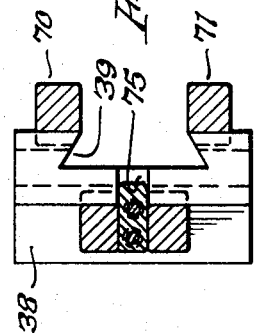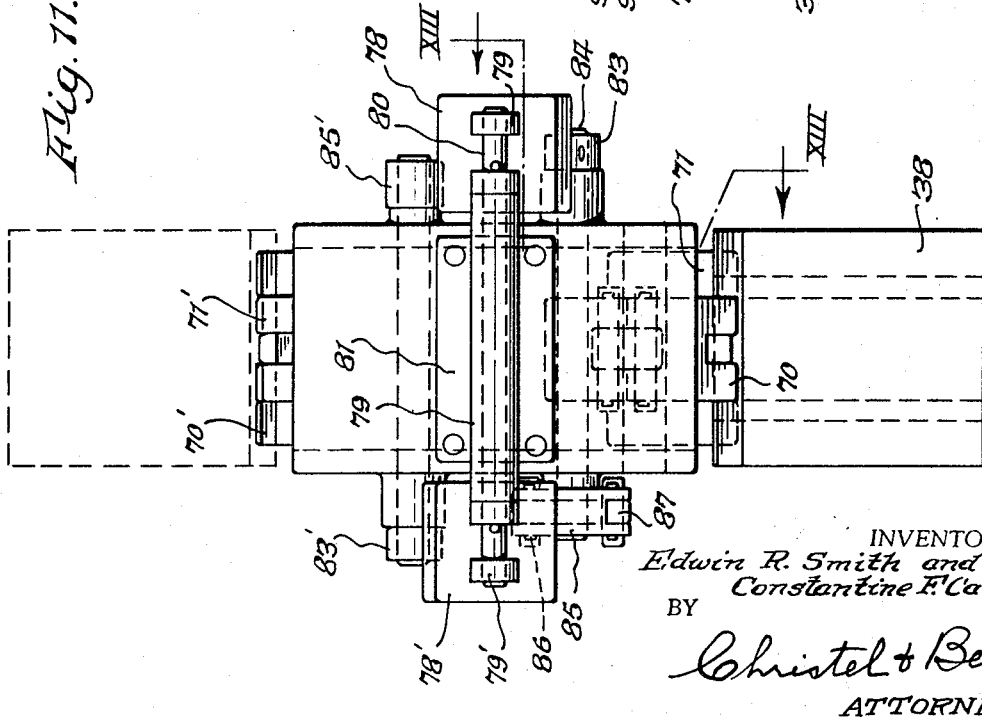

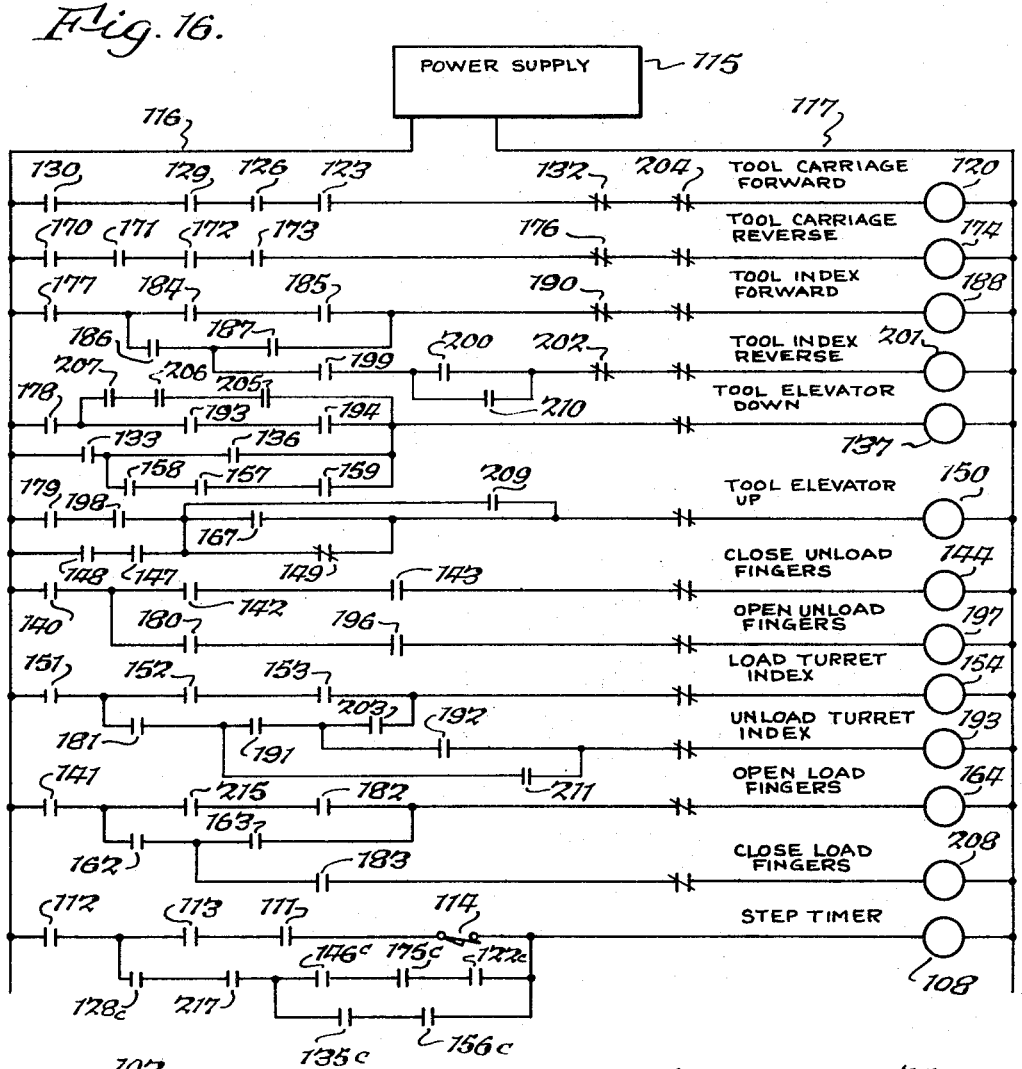

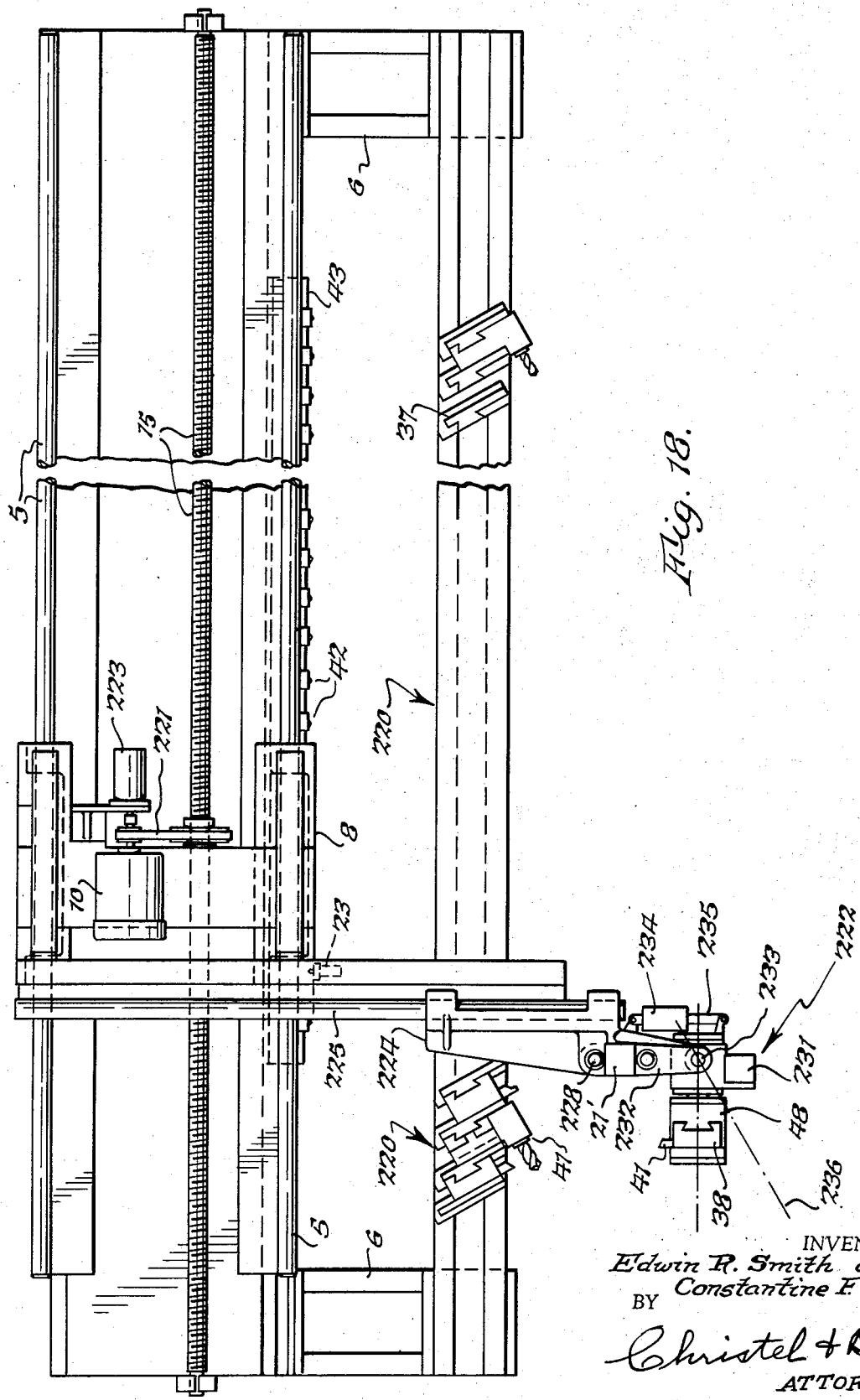

TOOL CHANGING AND TRANSFER MECHANISM

BACKGROUND OF THE INVENTION

This invention relates to tool changing mechanisms and, more particularly, to a tool changing mechanism for changing and transferring tools between a machine tool holding member and a relatively remote and stationary tool storage member.

Tool changing mechanisms heretofore available are primarily adapted for changing tools on machines such as drill presses, boring machines and drilling machines wherein the tool contacts the part to be machined at a single location. In other words, the part to be machined is brought to the tools so that the tool storage member and the part spindle are fixed in position relative to each other.

In a machine such as a lathe for turning and boring, however, the part to be machined is in a relatively fixed position, and the tool holding member must be brought to the part at various locations. The requirement that the tool holding member must be brought to the part gives rise to difficult problems in the design of tool changing mechanisms. If, for example, the tool storage member must be carried by the moving tool holding member, the storage member would by necessity be of limited capacity.

SUMMARY OF THE INVENTION

It is, therefore, an object of this invention to provide a mechanism for transferring and changing tools between a machine having a tool holding member and a tool storage member arranged in spaced relation to the tool holding member.

It is a further object of this invention to provide such a tool transfer and changing mechanism operable with a tool storage member which is stationary and remotely positioned relative to a movable tool holding member.

It is a further object of this invention to provide such a tool transfer and changing mechanism for automatically replacing and removing any of a plurality of tools from the tool storage member and delivering and removing tools from the tool holding member.

This invention provides, in combination with a machine having a tool holding member, a tool changer movable between the tool holding member and a tool storage magazine adapted to store a plurality of tools in a plurality of storage positions. The tool changer, when located at the storage magazine, is movable through a path adjacent the storage positions and is stopped at any of a plurality of storage positions to replace and remove tools from the storage magazine, in accordance with a predetermined program, and when located at the tool holding member, delivers and removes tools to and from the member.

The foregoing and other objects, advantages and characterizing features of this invention will become apparent from the ensuing detailed description of the illustrated embodiments thereof, reference being made to the accompanying drawings depicting the same wherein like reference numerals denote like parts throughout the various views.

BRIEF DESCRIPTION OF THE DRAWINGS

FIG. 1 is a fragmentary front elevational view of one embodiment of the tool changing and transfer mechanism provided by this invention shown in combination with a portion of a machine having a tool holding member, the tool changer being shown in its exchange position at the machine;

FIG. 1A is a view like that of FIG. 1, but with the tool changer being shown at the storage magazine, FIGS. 1 and 1A together showing a complete mechanism;

FIG. 2 is a fragmentary sectional view thereof on an enlarged scale taken about on line II—II of FIG. 1;

FIG. 3 is an enlarged, fragmentary sectional view thereof taken about on line III—III of FIG. 1;

FIG. 4 is a fragmentary plan view of the mechanism of FIG. 1;

FIG. 5 is a fragmentary side elevational view of the mechanism of FIG. 1A taken from the right-hand side thereof and showing a portion of a machine having a tool holding member;

FIG. 6 is an enlarged view of a portion of FIG. 5;

FIG. 7 is a front view of the portion shown in FIG. 6;

FIG. 8 is a fragmentary sectional view taken about on line VIII—VIII of FIG. 7;

FIG. 9 is a fragmentary plan view of a modification of a portion of the mechanism of FIG. 1;

FIG. 10 is an enlarged elevational view of the tool carrier member of the mechanism of FIG. 1;

FIG. 11 is a view of the carrier member of FIG. 10 rotated through 90°;

FIG. 12 is a sectional view taken about on line XII—XII of FIG. 10 with parts removed for convenience in illustration;

FIG. 13 is a sectional view taken about on line XIII—XIII of FIG. 11 with parts removed for convenience in illustration;

FIGS. 14–16 are wiring diagrams of an electrical control arrangement for the mechanism of FIG. 1;

FIG. 18 is a fragmentary plan view of the mechanism of FIG. 17.

DESCRIPTION OF THE ILLUSTRATED EMBODIMENTS

Referring now in detail to the embodiment illustrated in FIGS. 1–13 of the accompanying drawings, there is shown an automatic tool changer of this invention in conjunction with a machine tool comprising, in the illustrated embodiment and particularly in reference to FIG. 5, a lathe having a bed 1, a carriage 2 movable lengthwise of the bed and a cross slide 3 carried by the carriage for movement therewith and mounted for crosswise movement relative thereto.

Figure 17:
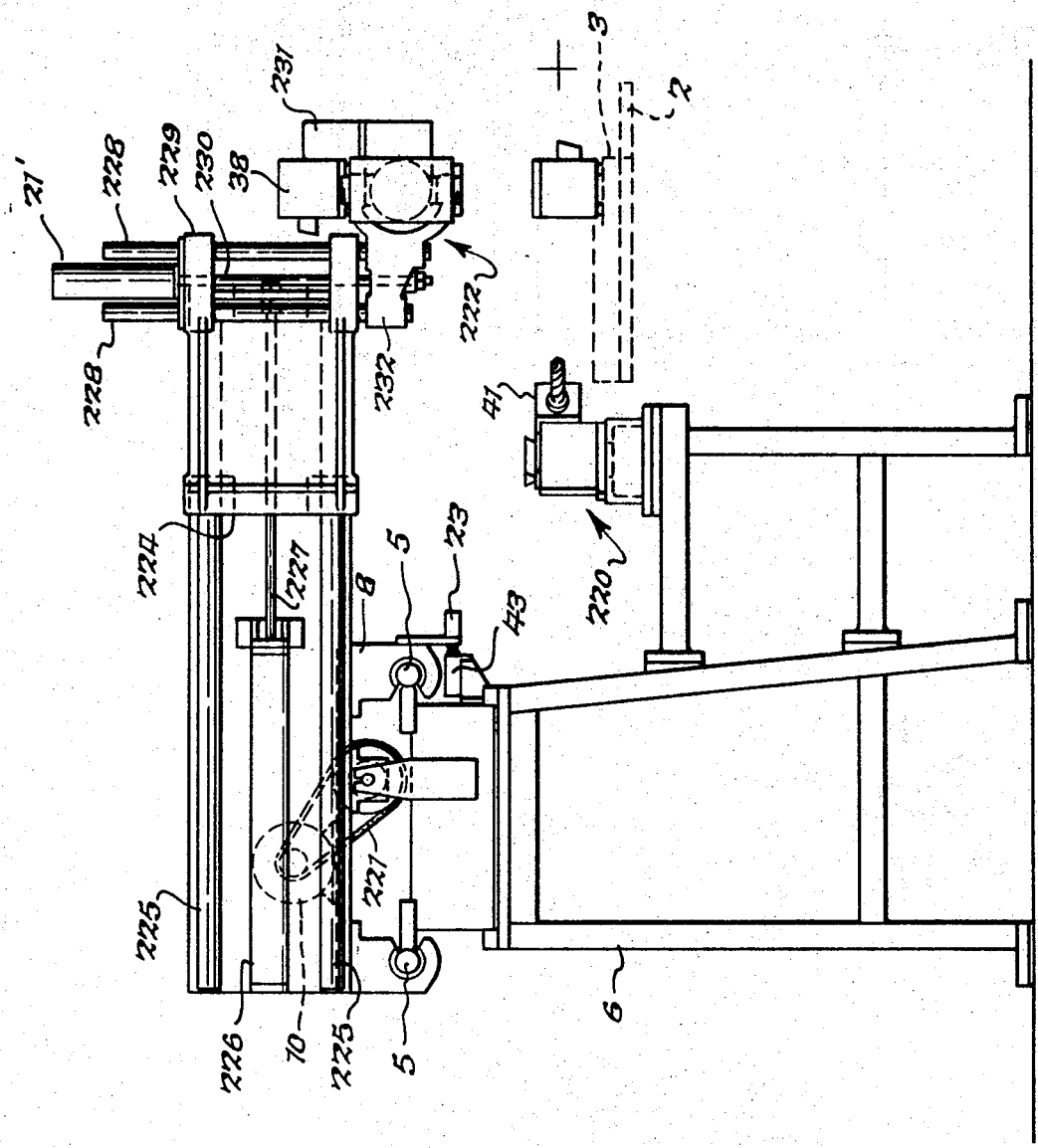
FIG. 17 is a fragmentary side elevational view of an alternative embodiment of the tool changing and transfer mechanism provided by this invention shown in combination with a portion of a machine having a tool holding member.

The spindle axis of the lathe is indicated by the dot dash line in FIG. 1, and by the crossed lines in FIGS. 5, 7 and 17.

Referring now to FIGS. 1 and 1A, the tool changer mechanism is mounted on a supporting framework including an elongated rail 5 supported adjacent its opposite ends by legs 6, the latter being of any suitable construction, and supporting brackets 7 to which the rail 5 is secured adjacent its opposite ends. A carriage 8 is mounted on rail 5 by means including upper and lower guide bars 9 extending therealong. A carriage drive motor 10 is mounted on carriage 8, the output shaft 11 of motor 10 being coupled at 12 to a worm 13 (FIG. 2) engaging a worm wheel 14 on a carriage feed screw 15 which latter extends lengthwise of rail 5, between end brackets 16 carried thereby. The worm 13 is journaled in a housing 17 mounted on carriage 8, as shown in FIG. 2, whereby motor 10 rotates the worm 13 to rotate wheel 14 which is in driving engagement with the carriage for moving the latter in opposite directions along rail 5.

A shaft 18 (FIG. 3) is supported in a cylindrical portion 19 of carriage 8 for rotation about its longitudinal axis, and for extension and retraction along its longitudinal axis by a cylinder 21 which is conveniently carried at the upper end of the carriage housing 19. Shaft 18 carried an arm 22 for rotation therewith, the arm 22 carrying a sensing head 23 for a purpose to be described. A bracket 25 also is mounted on shaft 18, for movement therewith. A member 26 is slidable in bracket 25, and carries adjacent one end a device 27 on which a tool carrier 28 is pivoted by means of a shaft 29.

Shaft 18 is extended and retracted along its axis by cylinder 21 by conventional hydraulic or electromechanical motive means. It is rotated about its axis by a drive motor 31 having its output shaft coupled at 32 to a worm 33 engaging a gear 34 keyed to shaft 18, as shown in FIG. 3, for rotating the latter while permitting longitudinal movement thereof relative to the gear 34.

A tool storage rack or magazine 35 is mounted on a supporting bracket 36 fixed to the supporting frame 5, 6 at a point spaced from the machine tool. A plurality of support devices 37 (FIG. 4) are annularly arranged around magazine 35 and adapted to receive tool holders 38. Holders 38 are dovetailed, as shown at 39, and hold any of a wide variety of tools including, for example, a center drill, a reamer, a grooving tool, a boring bar, and whatever other tool 41 may be desired.

Obviously, magazine 35 can be of any desired configuration and length, arranged to accomodate any number of tools. The tool holder supports 37 define tool holder positions at each of which a predetermined tool is placed.

Fixed to the carriage 8 above arm 22 is a series of annularly arranged locating stops 42 which can be of any desired configuration. In the illustrated embodiment the stops are mounted on a circular plate 43, and comprise pivoted members having outwardly converging cam surfaces, the members being urged outwardly by a solenoid 44 when the latter is energized, against a return spring 45. Stops 42 are adapted, when extended, to be engaged by the stylus 46 of sensing head 23 which can comprise a linearly variable transformer, the armature of which is connected to stylus 46 and adapted to reach a null position when stylus 46 is urged inwardly against its return spring by an extended stop 42.

Assume now that the tool changer has deposited a new tool on a machine tool holder 48 as shown in FIG. 1, which latter has a dovetail 49 engaging the dovetail 39 on the tool holder (FIG. 4). The tool carrier 28 will have first picked up the used tool 41, and will be carrying it for return to the storage magazine 35. Motor 10 is activated to drive carriage 8 along rail 5 until shaft 18 is coincident with the axis of the tool storage magazine 35. This is determined by stop means including, in the illustrated embodiment, a stop member 51 mounted on a bracket 52 carried by rail 5 and having a cam surface 53 engaged by the sensing stylus 54 of a variable transformer 55, attached to the carriage 8, the armature of which transformer will achieve a null position when carriage 8 is properly positioned to return the used tool to the rack and to pick up a new tool from the rack. When this null condition is reached, a cylinder 56 connected to arm 26 is activated by suitable electromechanical or hydraulic means, extending a rack 57 engaging a gear 58 within the device 27, imparting a 180° rotation to tool carrier 28, so as to position the used tool below carrier 28 and ready it to be lowered onto its support 37. The stop 42 denoting the preselected position of that particular tool will be extended, by means to be described, and motor 31 is activated, rotating shaft 18 and with it arms 22 and 26, moving sensing head 23 along a path intersected by the extended stop 42, and simultaneously moving tool carrier 28 along a path over the tool magazine 35. When carrier 28 is at the proper position, as determined by engagement of sensing head stylus 46 with the extended stop 42, motor 31 stops and cylinder 21 is operated to lower tool carrier 28, returning the used tool and its holder 38 to its preselected stored position. After tool holder 38 is in position on support 39, tool carrier 28 releases it, as will be described, and cylinder 21 is again operated to raise shaft 18. After the used tool has been returned, the stop 42 denoting its position is retracted, and a new stop 42, denoting the position of the new tool, is extended automatically. Motor 31 is again activated, rotating shaft 18 until tool carrier 28 is positioned over the preselected new tool to be used, as determined by whatever programming means are used. Upon arrival at the position of the new tool as determined by engagement of stylus 46 with the extended stop 42, carrier 28 is lowered by cylinder 21 as previously described to engage the new tool whereupon it is lifted by cylinder 21, and cylinder 56 is activated to again rotate carrier 28 through 180°, whereby the new tool is positioned above the carrier.

When it is time to replace the tool in use with the new tool, the machine carriage 2 is returned to the preselected exchange position and carriage 8 is driven along rail 5 to the exchange position, at which time cylinder 21 is activated to lower carrier 28 into position for engaging the used tool. Carriage 8 is precisely stopped at the exchange position by means shown in FIGS. 6–8 including a sensing head 60 carried by shaft 18 at its lower end and including a linearly variable transformer having a sensing stylus 61, spring-urged to project therefrom. Stylus 61 is adapted to engage the cam surface 62 of a stop 63 which latter is mounted on a bracket 64 secured to the machine bed 1. It will be noted that stop 63 is vertically elongated, thereby to maintain carriage 8 at the exchange position as tool carrier 28 is lowered and then raised. The carrier 28 first is lowered to engage the used tool and lift it from the machine tool support 48. Then, cylinder 56 is activated to rotate carrier 28 through 180°, whereupon cylinder 21 is lowered again, to lower the new tool onto the machine tool support 48. Cylinder 21 then raises the carrier 28, with the used tool in position above the carrier, and the carriage 8 is returned to the storage position where the previously described action is repeated.

A cylinder 65 as shown in FIG. 9 can be provided for extending the member 26 and thereby adapting the device to a storage magazine of larger radius. Also, it can adapt the device for use with plural magazines arranged in concentric arcs.

The tool carrier 28, as shown in more detail in FIGS. 10-13, has opposite pairs of clamping jaws 70, 71 adapted to engage about an upstanding dovetail 73 on each tool holder 38. A centralizing key 74 comprises part of each jaw 70, and is adapted to be received in a groove 75 in the dovetail 73, shown in FIG. 12, for centering the tool holder 38 relative to the carrier 28. One pair of jaws 70, 71 are pivotally supported in carrier 28 as indicated at 76 in FIG. 10, and the opposite pair of jaws is pivotally supported in the carrier 28 at 76'. Since the actuating mechanisms for the respective pairs of jaws are identical, only one will be described in detail, the corresponding parts of the other having the same number, but with a prime.

An actuating cylinder 78 is pivotally supported by ears 79 on a pivot pin 80 extending from opposite ends of a cylinder bracket 81 mounted on the housing of carrier 28. The piston rod 82 of cylinder 78 is connected to a link 83 secured to a shaft 84 extending through the carrier housing. Another link 85 is secured to the opposite end of shaft 84, and is pivotally connected at 86 to a connecting link 87 which is, in turn, pivotally connected to a link 88 pivoted on the carrier housing on an axis parallel with the link 83, on a shaft 89 to which is pivoted a yoke 90. A link 91 is pivotally connected to yoke 90 and to jaw 70 for rotating the latter about its pivot 76. In like manner, a link 92 is pivotally connected to jaw 71 and to yoke 93 fixed to the shaft 84, for pivoting jaw 71 about its axis. Thus, cylinder 78, when activated by suitable means, will cause an equal and opposite pivoting of the jaws 70, 71 to alternately engage and release the tool holder 38.

Figure 15:
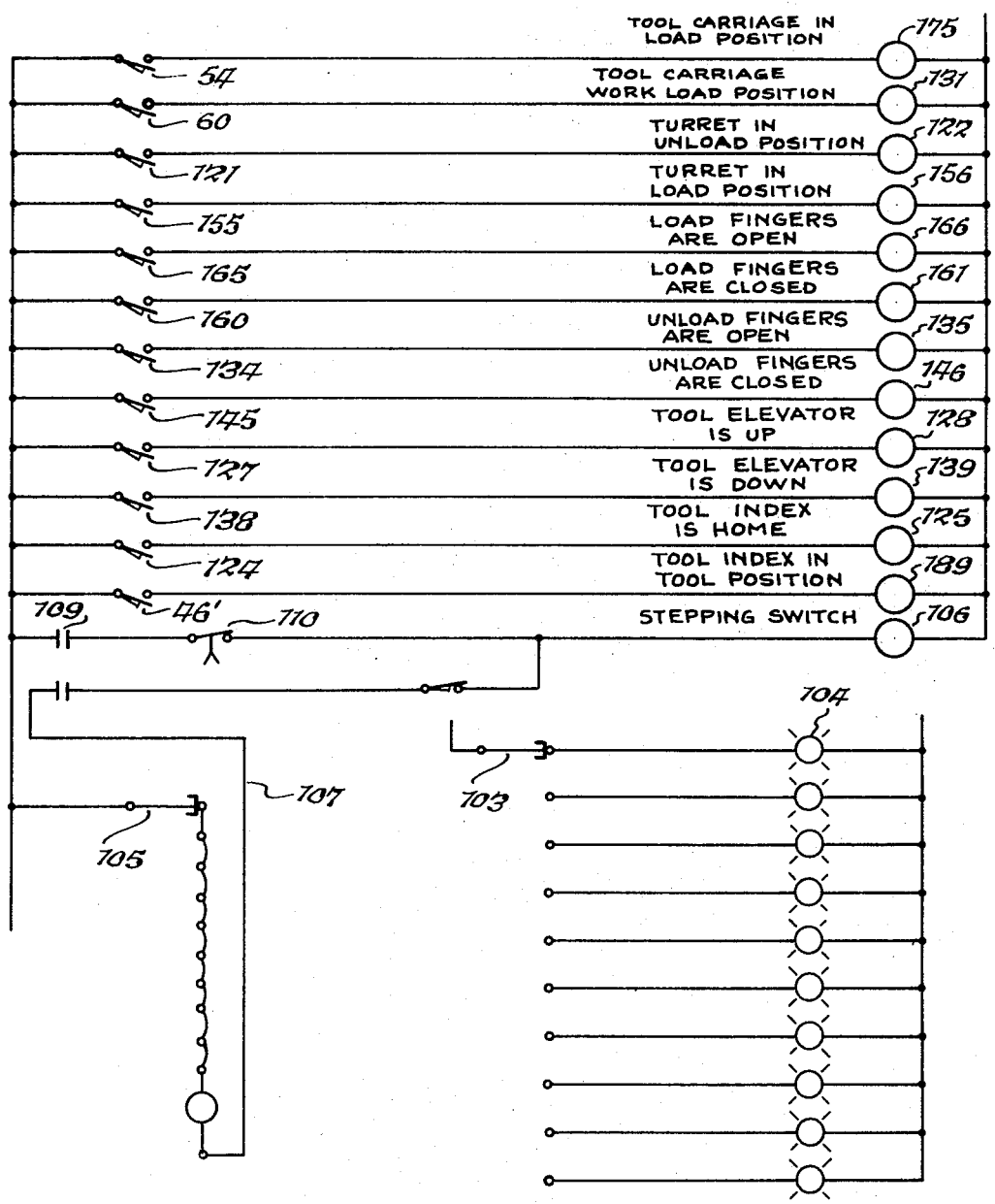

One example of an electrical control arrangement for the tool changer provided by this invention is shown in the wiring diagrams of FIGS. 14–16. The various stop solenoids 44 are controlled by means including selector switches 95, 95'. While only two such switches are shown, for convenience in illustration, it will be appreciated that a selector switch will be provided for each tool storage position. Each switch can have a number of positions equal to the number of tool storage positions, and is adapted to connect a stepping switch lead 96 to any one of the solenoids 44, thereby connecting the successive positions 97, 98, 99, 100, 101, etc. of the stepping switch to energize any of the various stop actuating solenoids in accordance with a pre-established pattern.

The stepping switch shown in the drawings has three decks, with each deck having a movable contact element, the three elements being movable in unison. The third deck has a movable element 102 (FIG. 14) adapted to engage the contacts 97, 98, 99, etc. in predetermined sequence, thereby energizing the various solenoids 44 in accordance with the pattern established by selector switches 95.

On a second deck, the stepping switch has a movable contact 103 (FIG. 15) adapted to successively complete energizing circuits to indicator lights 104, or the like, for indicating the position of the stepping switch and thereby indicating which tool is in use. A third deck of the stepping switch has a movable contact 105 adapted to engage successive contacts and thereby complete a circuit to the stepping switch coil 106 via lead 107, for a purpose to be described.

The stepping switch coil normally is energized under control of a stepping switch timer relay 108 (FIG. 16) adapted to close the normally open contacts 109 in an energizing circuit which includes a time delay switch 110 adapted to de-energize the coil 106 a predetermined time after closing of contacts 109. The operation is started by closing a machine start-of-cycle switch 111 completing an energizing circuit to the timer relay 108, provided the contacts 112 and 113 are closed. An interrupter switch 114 completes the circuit, this switch being closed when the stepping switch is in home position.

A description of the operation of the control may be observed by assuming that the tool changer has completed its operations at the storage magazine 35 and that the carriage 8 is ready to travel to the left in FIG. 1 and deposite the new tool it has obtained from the storage magazine into the machine tool holder. The term "load" will be used in reference to the operation of removing a new tool from the magazine and placing it in the machine, and "unload" in reference to removing a used tool from the machine tool holder and replacing it in the storage magazine.

In FIG. 16 there is shown a conventional power supply 115 and supply conductors 116, 117, and the arrangement is such that the carriage will be moved to the left when relay 120 is energized. The tool carrier 28 is oriented such that the new tool is up, i. e. in the "unload" position, which is indicated by the closing of a limit switch 121 which energizes relay 122 to close contact 123. The tool carrier is rotatively oriented relative to the disc 43 in its home position as indicated by the closing of a switch 124 energizing relay 125 to close contact 126. The cylinder 21, designated for convenience the tool elevator, is in the up position as sensed by the closing of a limit switch 127 energizing relay 128 to close contact 129. When the machine tool has reached the end of a cutting operation, contact 130 is closed by appropriate means, and a circuit is completed to relay 120 resulting in the operation of drive motor 10 to move the carriage 8 to the left.

The arrival of the carriage at the desired position relative to the machine tool is sensed by the engagement between stylus 61 and cam surface 62 and is represented schematically by the closing of switch 60 which energizes relay 131 to open contact 132 so as to shut off the motor 10 and also to close a contact 133. The set of jaws in the carrier 28 which are about to grip the used tool have been open and will be designated the "unload" set of jaws. The open condition of the "unload" jaws is indicated by the closed state of switch 134 which energizes relay 135 to close contact 136. Hence, upon the closing of switch 60 and thus contact 133, relay 137 is energized to activate the motive means operatively connected to cylinder 21 to lower the tool carrier 28. When the cylinder or "tool elevator" is down to a preselected level, switch 138 closes to energize relay 139 to close contacts 140, 141. Contact 142 was closed previously in response to the closing of switch 60, and contact 143 was previously closed in response to the closing of switch 121. Relay 144 is thus energized to activate the appropriate cylinder 78, 78' on the tool carrier 28 to close the "unload" set of jaws to grip the used tool, the closing being indicated by the closing of a limit switch 145 which energizes relay 146 to close contact 147. Contact 148 was previously closed in response to the closing of switch 60 and a circuit is thus established through the normally closed contact 149 to relay 150.

Energization of relay 150 initiates the operation of cylinder 21 to raise the tool holder 28 whereupon its arrival at a preselected upper level causes the closing of limit switch 127 to again energize relay 128. Contact 151 is thus closed, and contact 152 was previously closed upon the closing of switch 60. The contact 153 was closed by relay 146 in response to the closing of the "unload" jaws of tool carrier 28, so a circuit is completed to relay 154, the energization of which causes the tool holder 28 to be rotated into the "load" position, i.e. the new tool carried thereby is now in the lower position. When the "load" position is reached, limit switch 155 closes which energizes relay 156 to close contact 157. Contact 158 was closed by relay 146 when the "unload" jaws closed to grip the used tool. Since the "load" set of jaws gripping the new tool are in the closed condition, limit switch 160 has been closed to energize relay 161 so that contact 159 has been closed.

Relay 137 is thus energized causing cylinder 21 to lower the tool carrier 28, and when the lowering is completed switch 138 again closes to energize relay 139. Contact 141 is again closed, contact 162 was previously closed upon the closing of switch 155 indicating that tool carrier 28 is in the "load" position, and contact 163 has remained closed in response to the closing of switch 60. Relay 164 is thus energized causing the "load" set of jaws to open and the new tool to be placed in the machine tool holder. The opening of the "load" jaws also closes a limit switch 165 to energize relay 166 and close contact 167. Contact 147 is closed because the "unload" set of jaws is closed on the used tool, and contact 148 has remained closed with switch 60. Relay 150 is thus energized causing cylinder 21 to raise the tool carrier 28 whereupon the limit switch 127 closes so as to energize relay 128.

At this point the carriage 8 is ready to be returned to the tool magazine 35. The energization of relay 128 in response to the "tool elevator" or cylinder 21 being up closes contact 170. With the tool carrier 28 being in the "load" position, switch 155 was closed to energize relay 156 and close contact 171. Since the "unload" set of jaws gripping the used tool are now closed switch 145 is closed to energize relay 146 and close contact 172. The "load" set of jaws being now open after release of the new tool has caused the energization of relay 166 and contact 173 is hence closed. A circuit is completed to the relay 174 which, in turn, operates the motor 10 to move the carriage 8 to the right. When the carriage reaches the desired position over the storage magazine 35, switch 54 is closed by stop 51 and relay 175 is energized.

The energization of relay 175 opens contact 176 to shut off motor 10 and closes contacts 177–183. Contacts 184–187 have been closed due to the energization of relays 156, 166, 128 and 146, respectively, as previously described, and a circuit is thus completed to relay 188. The energization of this relay causes the operation of drive motor 31 to move the tool carrier 28 around the storage magazine 35. This movement of the tool carrier in a path around the storage magazine continues until the storage position for the used tool is located as signaled by the closing of switch 46' by a projecting stop 42 which causes the energization of relay 189 which, in turn, opens contact 190 to shut off the motor 31.

The closing of contact 181 results in the tool carrier 28 being rotated to the "unload" position. More particularly, contact 151 was closed due to the tool elevator being up as previously described. Contact 191 is closed because relay 166 is energized as a result of the open condition of the "load" set of jaws. Contact 192 is closed since relay 146 is energized due to the closed condition of the "unload" jaws carrying the used tool. A circuit is thus completed to relay 193 which commands the tool carrier 28 to be rotated by means of the cylinder 56 so that the used tool is in the lower position.

Completion of this rotation causes switch 121 to close and relay 122 to be energized so as to close contact 194. Contact 193 was previously closed by relay 146 due to the closed condition of the "unload" jaws carrying the used tool, and contact 178 previously was closed by the arrival of the carriage 8. A circuit is completed to relay 137 commanding cylinder 21 to lower tool carrier 28 whereupon switch 138 closes to energize relay 139 and close contact 140.

The closing of contact 140 causes the "unload" jaws to open so that the used tool is replaced in its storage position. More particularly, contact 180 was previously closed upon arrival of the carriage, and contact 194 was previously closed by relay 146 since the "unload" jaws holding the used tool were, up to this point, closed. A circuit is completed to relay 197 which causes the activation of the appropriate cylinder 78 or 78' to open the "unload" jaws.

The opening of the jaws closes switch 134 to energize relay 135 and close contact 198. Contact 179 was closed due to the arrival of the carriage, and contact 167 was closed by relay 166 because the "load" set of jaws is open. A circuit is completed to relay 150 which causes the cylinder 21 to raise the tool holder 28. This raising, when completed, closes switch 127 to energize relay 128 and reclose contact 186. Contact 177 was previously closed upon the arrival of the carriage. Contact 199 is now closed because relay 135 was energized in response to the opening of the jaws which had carried the used tool. Contact 200 was closed by relay 166 because the "load" set of jaws is open.

A circuit is now completed to relay 201 which causes motor 31 to rotate in a reverse direction and thus move the tool carrier 28 back to a home position whereupon switch 124 is closed to energize relay 125 and open contact 202 to shut off the motor 31. The tool holder 28 is also rotated into the "load" position since relay 154 is energized. More particularly, the opening of the "unload" jaws which previously had gripped the used tool as indicated by the closing of switch 134 and energization of relay 135 results in the closing of contact 203. Contact 191 is closed because the "load" set of jaws is open, contact 181 was closed by the arrival of the carriage, and contact 151 is closed because the tool elevator or cylinder 21 is up.

When the tool carrier 28 has been rotated to the "load" position, switch 155 closes to energize relay 156 and reclose contact 184. Contacts 177 and 183 have remained closed. When the tool carrier 28 reaches the home position and motor 31 is shut off, contact 204 of an interlock relay is reclosed so that relay 120 can again be energized to move the tool carrier 28 in a forward path around the magazine 35 to a new tool position.

Upon arrival at that new position switch 46' is closed by the newly projecting stop 42 and relay 189 is energized.

This opens contact 190 to shut off motor 31 and closes a contact 205. Contact 206 was closed by relay 135 in response to the opening of the "unload" set of jaws. Contact 207 was closed by relay 156 in response to the tool holder 28 being rotated into the "load" position. A circuit is completed through these contacts and contact 178 to energize relay 137 which causes cylinder 21 to lower the tool carrier 28. This, in turn, closes switch 138 to energize relay 139 which recloses contact 141. Contact 162 was closed in response to the tool holder 28 being rotated into the "load" position, and contact 183 has remained closed as a result of the carriage position. Relay 208 is thus energized to close the "load" set of jaws upon the newly selected tool, which closing causes switch 160 to close, relay 161 to be energized, and contact 209 to be closed. A circuit through this contact and contacts 179 and 198 energizes relay 150 to cause the cylinder 21 to raise the tool carrier 28. Switch 127 is then closed, relay 128 energized, and contact 186 reclosed. Contact 177 has remained closed due to the carriage position. Contact 199 is closed since the "unload" set of jaws is open. A contact 210 was closed due to the closing of the "load" set of jaws. A circuit is completed to relay 201 which causes drive motor 31 to move the tool carrier 28 in a reverse direction back to the home position as signaled by the closing of switch 124 and energizing of relay 125. The closing of the "load" set of jaws, as indicated by the closing of switch 160 and energizing of relay 161, closes a contact 211 to complete a circuit to relay 193 which causes the tool carrier 28 to be rotated into the "unload" position.

Since the "load" set of jaws is closed, the "unload" set open, the tool carrier 28 in both the up and "unload" positions and returned to its home position, it will be apparent that contacts 123, 126 and 129 are closed and when the machine tool has finished its cutting operation as signaled by the closing of contact 130, the carriage will again move to the left and the sequence of operations thus described will be repeated. Alternatively, the circuit could be modified to cause the carriage to move to the left and wait there for the lathe operation to finish, as signaled by contact 130, and then proceed to effect a change without departing from the spirit and scope of this invention.

It is apparent from the foregoing description that as the tool carrier 28 is rotated in a forward direction about the storage magazine to replace the used tool, the storage position thereof is located by a projecting stop 42 closing the switch 46'. After the used tool is replaced the carrier is rotated in a reverse direction back to a home position whereupon it is again rotated in a forward position to pick up a new tool, the position of which is indicated by a newly projecting stop 42. The previously described stepping switch under control of the timer relay 107 and circuitry associated therewith function to project the stops 42 at the proper time relative to the movements of the carrier 28 and in a sequence predetermined by the settings on the selector switches 95.

Contact 112 is under control of relay 166 and hence will be closed only when the "load" jaws are open and thus from the time the carriage is about to begin a movement toward the storage magazine 35 until a new tool is picked up from the magazine. An energizing circuit to relay 108 is completed, however, only when the carrier 28 is in the home position as indicated by the closing of switch 114 and contact 217 and when the "unload" jaws have opened, as indicated by the closing of contact 113. This insures that a new stop 42 will be projected only after the used tool has been replaced in the magazine and the carrier 28 has returned to the home position.

In this particular illustration the tool storage magazine 35 extended through an arc of 180° and it was thus necessary to return the carrier 28 to a home position and then proceeding again in a forward direction to grip a new tool. With a circular magazine, however, the reverse return to a home position could be avoided.

The various switches and relays can be of conventional design, and suitable locations for the various switches on the tool changer mechanism will be obvious to those skilled in the art.

While the arcuate storage magazine provides the advantage of a greater effective storage length in a given area, it should be understood that the storage magazine can have various configurations and locations and remain within the spirit and scope of this invention. FIGS. 17 and 18 show an alternative embodiment of the tool changing and transfer mechanism of this invention adapted for use with a rectilinear storage magazine 220 extending parallel to the path of travel of the carriage 8 which is driven by motor 10 through a coupling 221 and a feed screw 15. A carriage positioning potentiometer 223 also is coupled to motor 10. The machine tool carriage 2 and cross slide 3 are spaced from the magazine 220. The mechanism would be mechanically modified slightly to enable a tool carrier, indicated generally at 222, to be moved laterally between the magazine 220 and the machine tool holder. Carrier 222 is mounted on a member 224 laterally movable along guide bars 225 by a cylinder 226 having a piston rod 227 connected to carrier member 224. Bars 225 and cylinder 226 are mounted on a frame carried by carriage 8. As the carriage 8 is moved along the rail 5, the storage positions of the used and new tools would be indicated by the stops 42 which can be located conveniently on the rail 5. The engagement of a projecting stop 42 by sensing means 23 would signal to stop motor 10 as before, and operation of cylinder 21 and carrier 222 would proceed in a manner similar to that of the embodiment previously described.

Tool carrier 222 corresponds to carrier 28 of the first embodiment, having the same gripping jaws and jaw actuating arrangements, and is mounted on member 224 for vertical reciprocation by drive cylinder 21'. Carrier 222 is carried by a bracket 232 mounted on guide bars 228 which are journaled in brackets 229 on member 224. Piston rod 230 of cylinder 21' is connected to carrier bracket 232. A cylinder 231 is arranged to index carrier 222 180° about a horizontal axis to reverse the relative positions of the tool gripping jaws. Carrier 222 also is movable about a third axis, having a pivot connection at 233 with bracket 232. A cylinder 234 is pivotally mounted on bracket 232, and has its piston rod 235 pivotally connected to carrier 222 to swing it about pivot axis 233 between the position shown in FIG. 18 in which carrier 222 is aligned with the tool holder of cross slide 3, and an angled position indicated by center line 236 (FIG. 18) aligning tool carrier 222 with the tool holders 38 of the storage magazine. Such angular orientation of tool carrier 222 can be arranged to occur in response to arrival of carrier 222 at its laterally extended and retracted positions.

Since the operation of the embodiment of FIGS. 17 and 18 otherwise is substantially the same as that of the first embodiment, and obvious therefrom, no further description is necessary.

Accordingly, it is seen that the invention fully accomplishes its intended objects. The mechanism transfers and changes tools between a machine having a tool holding member and a tool storage member arranged in spaced relation to the tool holding member, and it automatically replaces and removes any of a plurality of tools from the storage member and delivers and removes tools from the holding member. It will be appreciated that the foregoing detailed description of selected embodiments is given by way of illustration only, without thought of limitation.

We claim:

1. Tool changing and transfer mechanism comprising, in combination with a machine having a tool holding member, a tool storage magazine arranged in spaced relation to said tool holding member, said magazine having means for storing a plurality of tools in a plurality of storage positions, a tool changer movable between said tool holding member and said tool storage magazine, drive means for moving said changer through a path adjacent said storage positions, control means associated with said drive means, sensing means movable with said changer relative to said magazine and arranged in controlling relation to said drive control means, stop means associated with said storage positions and interacting with said sensing means when actuated, programming means for selectively actuating said stop means, whereby said changer is stopped at any of a plurality of positions along said path corresponding to said storage positions, and means associated with said changer for replacing and removing tools from said magazine and for delivering and removing tools from said member.

2. Tool changing and transfer mechanism as set forth in claim 1, wherein said tool holding member is movable to a tool exchange position and said changer is movable between said tool exchange position and said storage magazine, said control means being operable to return a previously selected tool to that position in said storage magazine from which it was removed.

3. Tool changing and transfer mechanism as set forth in claim 2, wherein said control means include an energizing circuit for said changer drive means and said sensing means is arranged in controlling relation to said energizing circuit, said stop means comprising locating stops associated with said magazine position and engagable by said sensing means when actuated.

4. Tool changing and transfer mechanism as set forth in claim 1, wherein said changer includes a carrier having plural tool engaging devices for simultaneously carrying a used tool being returned and a new tool to be used, and means for moving said carrier to alternatively position said tool engaging devices for tool removal and insertion relative to said member and said magazine.

5. Tool changing and transfer mechanism as set forth in claim 4, together with means for extending and retracting said carrier along a first axis for insertion and removal of a tool, and means for rotating said carrier about a second axis intersecting said first axis for alternative positioning of said devices.

6. Tool changing and transfer mechanism as set forth in claim 5, together with means for rotating said carrier about a third axis to orient the same one way for removing and replacing tools relative to said magazine and another way for removing and inserting tools relative to said member.

7. Tool changing and transfer mechanism as set forth in claim 5 wherein said carrier is extended and retracted along a vertical axis.

8. Tool changing and transfer mechanism as set forth in claim 4, wherein said tool storage magazine includes means for storing multiple tools in predetermined positions along a curvilinear path, and said carrier is mounted for moving said devices through said path.

9. Tool changing and transfer mechanism as set forth in claim 8, together with a second tool storage magazine having multiple tool storage positions arranged on a path concentric with said curvilinear path, and means for shifting said carrier to swing said devices through either path.

10. Tool changing and transfer mechanism comprising, in combination with a machine having a tool holding member, a stationary tool storage magazine separate from said machine arranged in spaced relation thereto in a relatively remote position, said magazine having means for storing a plurality of tools in a plurality of stationary storage positions, a tool changer movable linearly along a first path between said machine and said tool storage magazine, said changer having an axis and being movable through a second path separate and distinct from said first path and adjacent said stationary storage positions, means operable to stop said changer at any of a plurality of positions along said path corresponding to said storage positions, means for extending and retracting said changer along said changer axis for insertion and removal of a tool, and carrier means associated with said changer for replacing and removing tools from said magazine and for delivering and removing tools from said member said carrier means being rotatable about a first axis traverse to said changer axis to alternatively position said carrier for tool removal and insertion relative to said member and said magazine and said carrier means being pivotable about a second axis to orient the same one way for removing and replacing tools relative to said magazine and another way for removing said inserting tools relative to said member.

* * * * *